(No Model.)
S. WILLIAMS.
GAS METER.
No. 492,600. Patented Feb. 28, 1893.
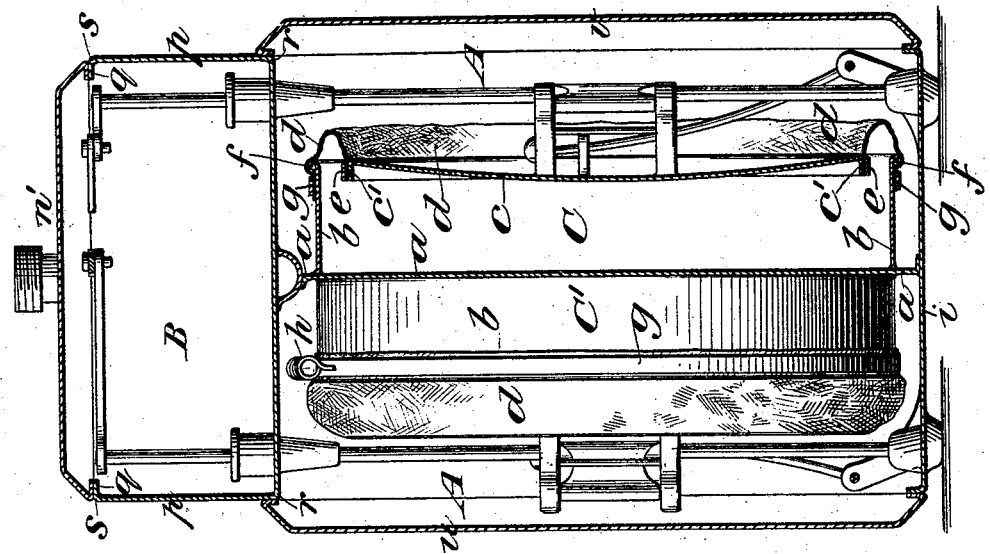
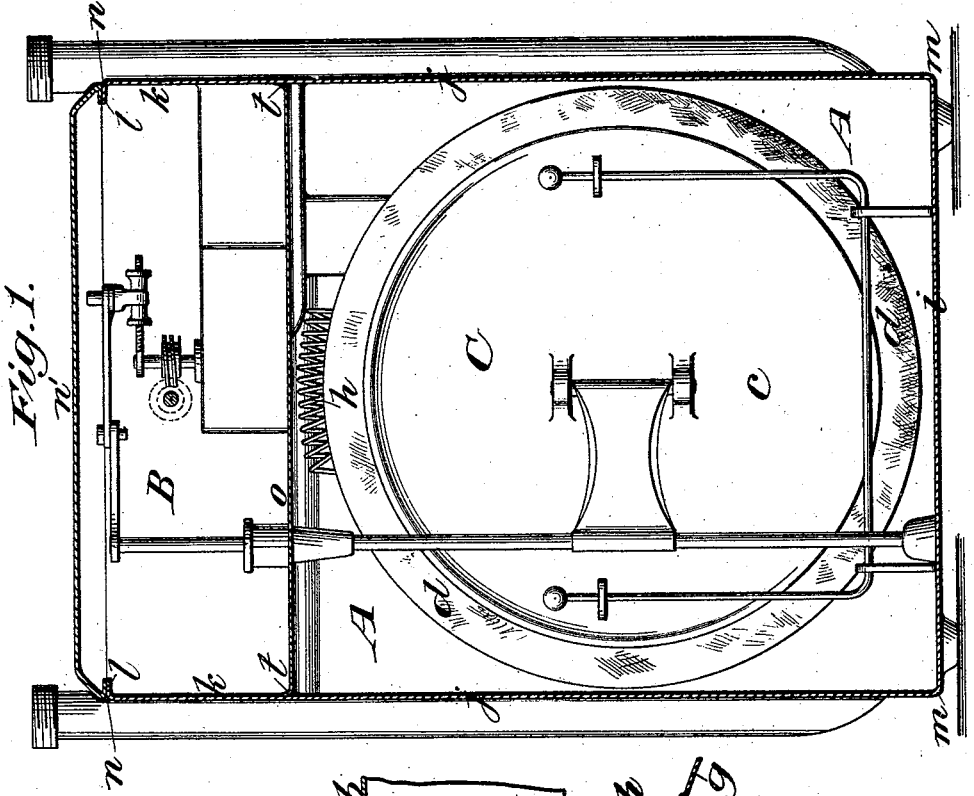
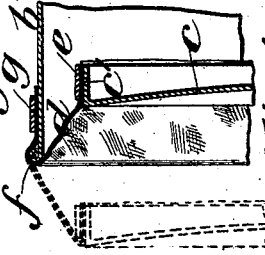
Witnesses:
D. H. Nayrod
C. E. Sundgren
Inventor:
Samuel Williams,
by attorneys
Brown & Seward

UNITED STATES PATENT OFFICE.

SAMUEL WILLIAMS, OF NEW YORK, ASSIGNOR TO HIMSELF, AND WALTER HENRY CRUMP AND THOMAS MARTIN, OF BROOKLYN, NEW YORK.

GAS-METER.

SPECIFICATION forming part of Letters Patent No. 492,600, dated February 28, 1893.

Application filed April 26, 1892. Serial No. 430,679. (No model.)

*To all whom it may concern:*

Be it known that I, SAMUEL WILLIAMS, of the city and county of New York, in the State of New York, have invented a new and useful Improvement in Gas-Meters, of which the following is a specification.

In the dry gas meters at present in common use there are two measuring chambers arranged on opposite sides of a fixed partition which forms one of the ends of each chamber, the other ends of the two chambers, consisting of movable heads which are composed of metal disks and flexible annular diaphragms, being united with annular rims which are affixed to the central wall or partition.

The present invention consists in part in an improvement in the construction of the movable heads of the chambers and in the combination of the said heads with the stationary rims as hereinafter described and claimed whereby the cost of manufacture of the meter is reduced and greater accuracy of measurement is obtained.

The invention also consists in a novel construction of the case of the meter whereby a saving of cost is obtained.

In the accompanying drawings which represent a meter embodying my invention, Figure 1 represents a vertical section taken in front of one of the measuring chambers and Fig. 2 represents a vertical section at right angles to Fig. 1, taken through one of the measuring chambers and outside of the other one. Fig. 3 is a sectional view corresponding with Fig. 2, but on a larger scale showing the details of the construction and attachment of the diaphragm. Fig. 4 is a detail view which will be hereinafter explained.

Similar letters of reference designate corresponding parts in all the figures.

A B designate the meter case consisting of a main casing A which contains the measuring chambers and the gallery B which contains the valves and their operating mechanism and the registering apparatus. As this valve operating mechanism and the registering apparatus need not differ from those in meters in common use, I do not think it necessary to fully represent or describe them.

C C' are the measuring chambers arranged within the casing A on opposite sides of the central partition plate $a$ of the said casing, the said partition plate forming the back or inner end of each measuring chamber. The other parts of each measuring chamber consist of the cylindrical rim $b$ and the movable head $c$ $d$ composed of a metal disk $c$ and an annular diaphragm $d$ of flexible material, commonly leather, connecting the said disk $c$ with the annular rim $b$. The disk $c$ which has an integral inwardly turned flange $c'$, is of a diameter considerably smaller than that of the outer rim $b$ of the chamber so that it and the leather diaphragm $d$ may pass freely into and out of the said rim $b$ as shown in Fig. 3 without material friction of the leather. The disk and diaphragm are shown in bold outline in Fig. 3 inside the said rim and in dotted outline outside said rim. The flexible diaphragm $d$ is united with the metal disk $c$ by having its inner margin drawn snugly around the flange $c'$ and having a metal band $e$ clamped tightly around the said margin as shown in Figs. 2 and 3.

To provide for the attachment of the outer margin of the flexible diaphragm $d$, the outer edge of the rim $b$ is turned outward to form a rounded flange $f$ over which the diaphragm may turn easily in entering the said rim $b$ without liability to be cut or broken. The outer margin of the diaphragm is drawn over the rim $b$ some distance beyond this flange $f$, and around the portion which extends beyond the said flange is applied a metal clamping band $g$ which clamps the diaphragm tightly around the rim $b$. This band $g$ is represented at $g'$ in Fig. 4 which is an edge view of a portion of it, as divided at one point and overlapped and having the parts on each side of the division connected by a spiral spring $h$ which serves to draw the said band tight and permits the removal of the said band at any time when it might be desirable to remove the diaphragm and the disk for repair or for any other reason.

By the above described construction of the movable head, an essential feature of which is that the disk is adapted to pass into and out of the outer rim $b$ of the measuring chamber, not more than one-third of the leather is used that is used in the diaphragms of the meters at present in common use and consequently there is less bulging and collapsing of the leather in the working of the meter. The bulging and collapsing of the leather is unavoidably more or less irregular and must give a more or less varying capacity to the measuring chamber whereby the accuracy of measurement is impaired. It is therefore obvious the less bulging and collapsing of the leather there is, the less is the liability to inaccuracy. Moreover in the ordinary construction the leather bulges very greatly beyond the circumference of the rim $b$ and is subject to friction against the sides of the casing A and its durability is thereby impaired. According to my improved construction the leather does not bulge considerably, if at all, beyond the circumference of the rim $b$ and therefore, besides obviating the friction and wear just mentioned, it does not require the casing A to be of so large capacity, and in fact it permits the measuring chamber of the capacity suitable for a five-light meter to be used in a casing of the size of that of an ordinary three-light meter. Furthermore by this construction and combination of the disk and the diaphragm and mode of attaching them to the fixed rim, a saving of about fifty inches of soldered seam is effected in an ordinary three-light meter.

The meter case A B constructed according to my invention has its bottom $i$, the opposite sides $jj$ of the casing A, the corresponding two opposite sides $k\ k$ of the gallery B and the flanges $l\ l$ provided on the corresponding sides at the top of the gallery for the attachment of the cover $n'$ all made in a single piece of sheet metal bent at the corners $m\ m\ n\ n$ as shown in Fig. 1. The deck or table-top $o$ forming the horizontal partition between A and B, the front and back $p\ p$ of the gallery and the flanges $q\ q$ for the attachment of the front and back of the cover $n'$, are all formed in another single piece by bending at $r\ r$ and $s\ s$, all as shown in Fig. 2. The edges of the table-top are soldered at $t\ t$ to the sides $j\ k$.

The parts above described consisting of the bottom and two sides of the casing A and gallery B, the table-top $o$ and the two other sides $p\ p$ of the gallery and the top flanges $l\ l$ and $q\ q$ are commonly made of six pieces. By this construction of two pieces I save in a three-light meter twenty-nine inches of soldered seams besides reducing the liability to leakage which may occur through imperfect soldering. The other parts of the case consisting of the front and back $u\ v$ and top in one piece are or may be constructed and soldered in their places in the same way as the corresponding parts of meters in common use.

What I claim as my invention, and desire to secure by Letters Patent, is—

1. The combination in the movable head of the measuring chamber of a gas meter, of a metal disk having an inwardly turned marginal flange $c'$, an annular flexible diaphragm having its inner margin drawn over the said flange, and a clamping band $e$ surrounding said inner margin and flange, substantially as herein set forth.

2. In the measuring chamber of a gas meter, the combination of a fixed outer rim, of a movable head consisting of a metal disk and an attached flexible annular diaphragm the outer margin of which overlaps said rim, a clamping band which is open at one point in its circumference and a spring applied to said clamping band for the purpose of tightening it upon said diaphragm and outer rim but permitting its removal therefrom, substantially as herein set forth.

3. The combination in the meter case of one piece comprising the bottom $i$, the opposite sides $j\ j$ and $k\ k$, of the main casing A and gallery B and the flanges $l\ l$ of said sides, and one other piece comprising the deck or table-top $o$, the sides $p\ p$ of the gallery and the flanges $q\ q$ of said sides, the edges of the said table-top being soldered between the sides $j\ j$ $k\ k$ of the main casing and gallery, substantially as herein set forth.

SAMUEL WILLIAMS.

Witnesses:
FREDK. HAYNES,
GEORGE BARRY.